N. Sims.
Refrigerator.
No. 260. A.I. Patented Dec. 13. 1859.
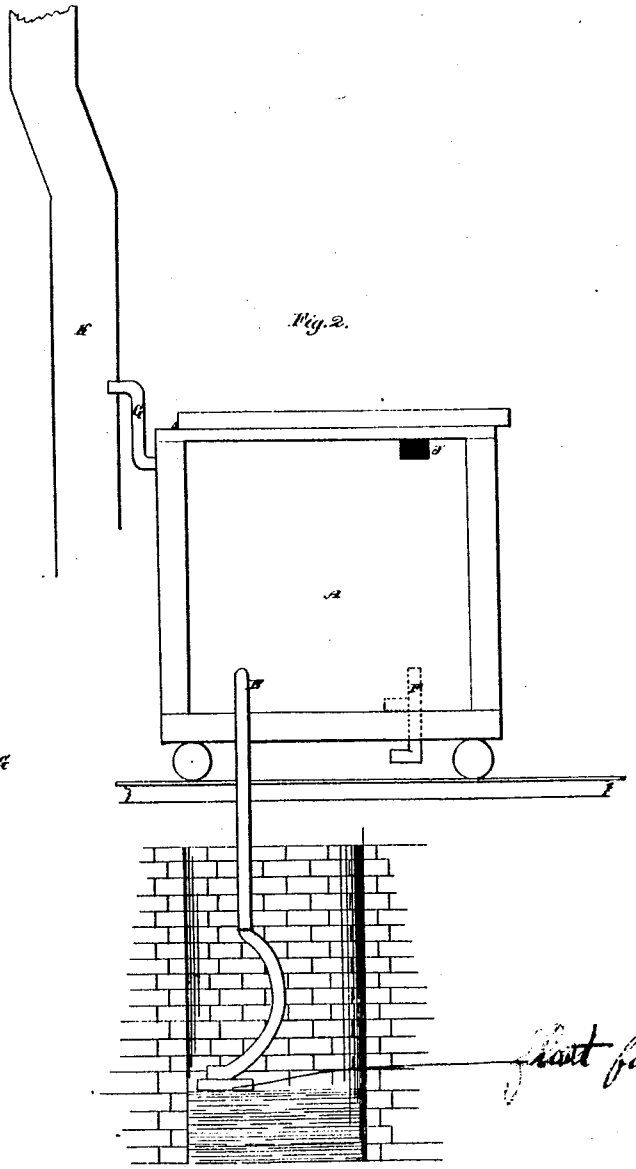
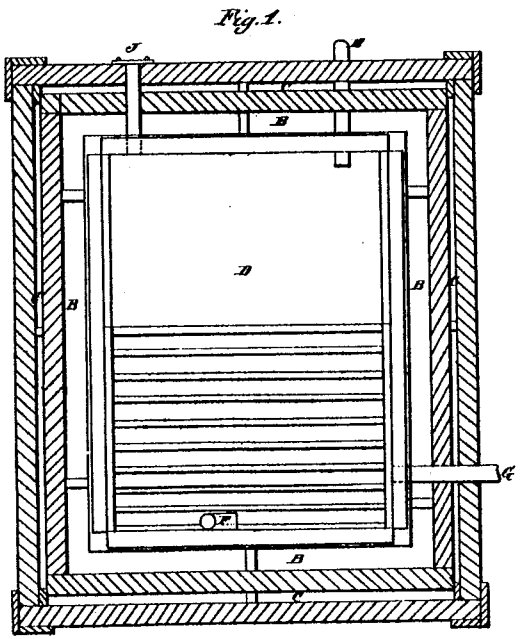
Witnesses.
H.B. Clifton
D.C.B. Coffin Jr.
Inventor.
N. Sims
N. PETERS, PHOTO-LITHOGRAPHER, WASHINGTON, D. C.